May 27, 1941.　　　　M. SCHWARTZ　　　　2,243,289
METHOD OF FORMING BUSHING STRUCTURES
Filed July 20, 1938　　　　5 Sheets-Sheet 1

Inventor:
Morris Schwartz
By Anso, Thiess, Olson & Mecklenburg
Attys.

May 27, 1941.　　　M. SCHWARTZ　　　2,243,289
METHOD OF FORMING BUSHING STRUCTURES
Filed July 20, 1938　　　5 Sheets-Sheet 2
Fig. 8.
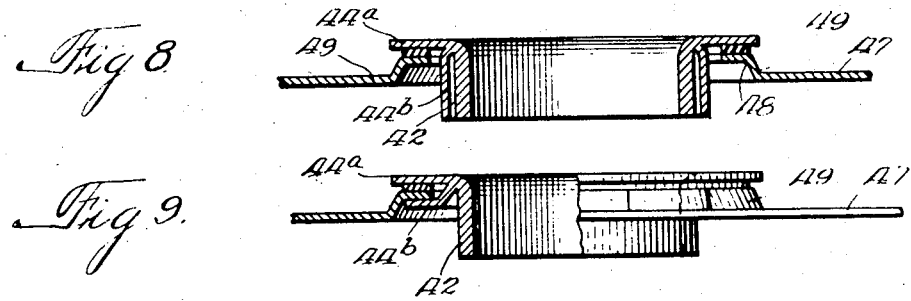
Fig. 9.
Fig. 10.
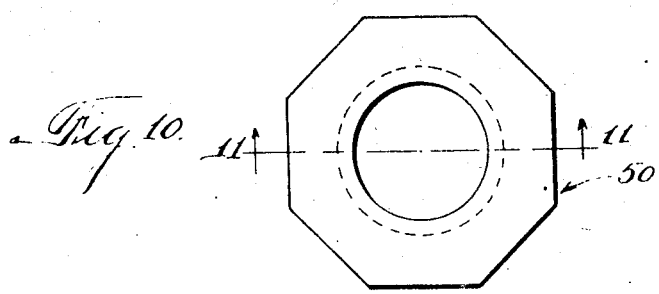
Fig. 11.
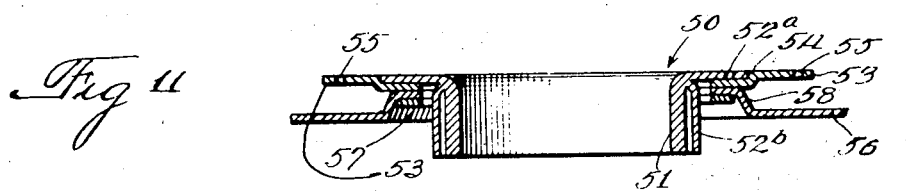
Fig. 12.
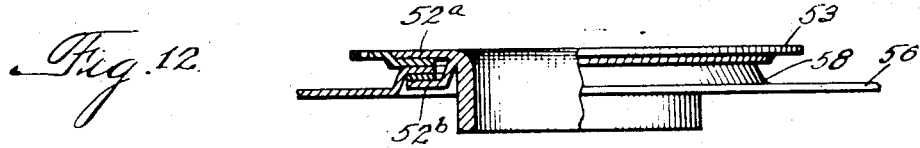
Fig. 13.
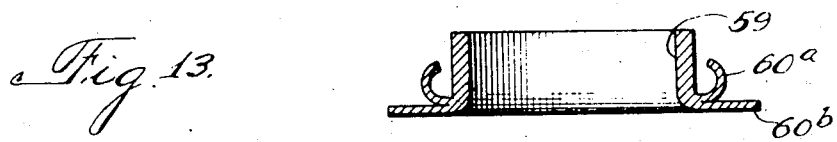
Fig. 14.
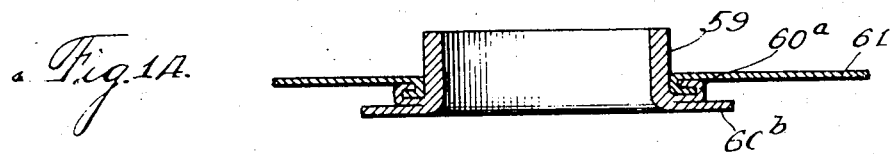
Inventor:
Morris Schwartz
By Ambro, Thiess, Olson & Mecklenburg
Attys.

May 27, 1941. M. SCHWARTZ 2,243,289
METHOD OF FORMING BUSHING STRUCTURES
Filed July 20, 1938 5 Sheets-Sheet 4
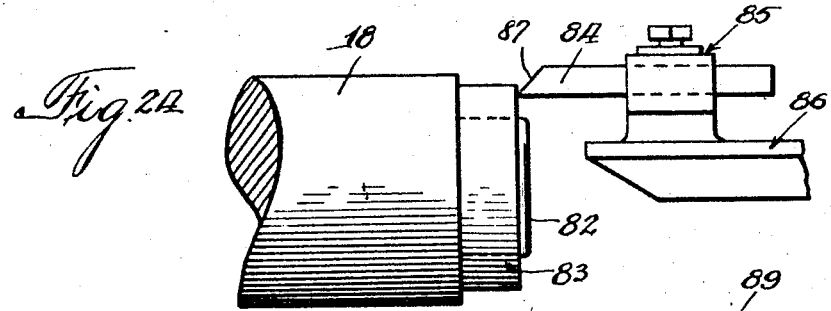
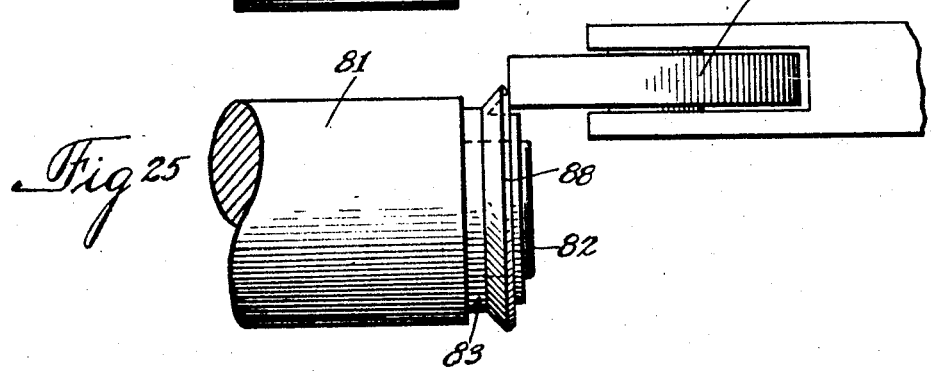
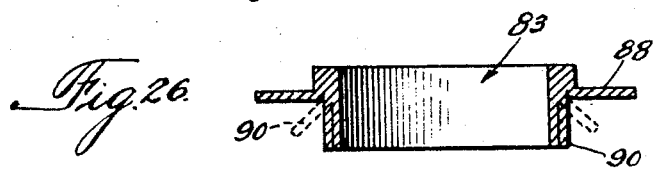
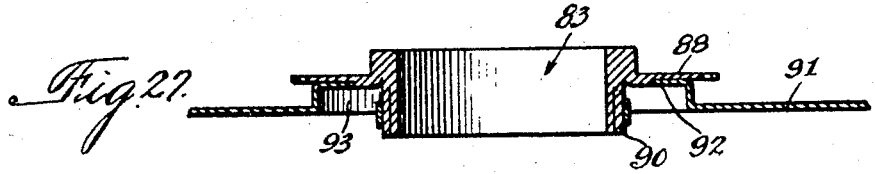
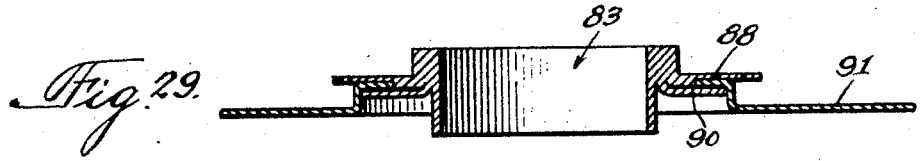
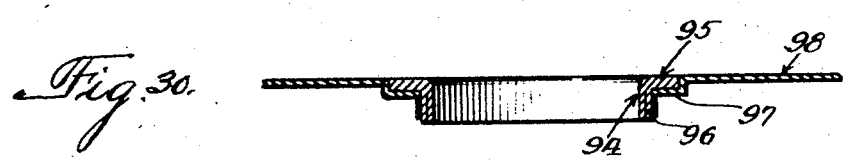
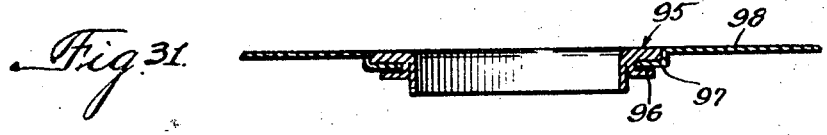

May 27, 1941.  M. SCHWARTZ  2,243,289

METHOD OF FORMING BUSHING STRUCTURES

Filed July 20, 1938   5 Sheets-Sheet 5

Inventor:
Morris Schwartz
By Amo, Thiess, Olson & Mecklenburg
Attys.

Patented May 27, 1941

2,243,289

UNITED STATES PATENT OFFICE 2,243,289

METHOD OF FORMING BUSHING STRUCTURES

Morris Schwartz, Chicago, Ill., assignor to Barrel Fitting & Seal Corporation, Chicago, Ill., a corporation of Illinois Application July 20, 1938, Serial No. 220,299

15 Claims. (Cl. 29—148.2)

This invention relates to a method of forming a bushing structure, and has special reference to the method of clamping a connecting means in a hole in the wall of a sheet metal container for shipping or storing liquids or semi-liquids, the connecting means detachably receiving a bung or other closure.

More particularly, this invention relates to the method of forming a bushing structure for a sheet metal container which consists in splitting an end or the ends of a cylindrical collar or a flange extending angularly from a cylindrical collar, in spreading the split portions to receive therebetween or in clamping engagement therewith a wall of the sheet metal container, and in clamping a split portion or the split portions against opposed sides of the wall.

Sheet metal containers as used commercially today for storing or shipping oils, alcohol and the like, are formed of as inexpensive steel as their manufacture will permit for ordinary use and because of the inexpensive character of the steel, the sheet material will not permit of very substantial drawing or forming operations. Bushing structures heretofore have required a substantial depth of draw in the wall or barrel head of the sheet metal container where such bushing structures include a connecting means in clamped engagement therewith. This type of bushing structure is preferred in the barrel trade since the welding of a connecting member to a sheet metal container has various disadvantages and primarily that of producing a scale which when dropped into the liquid or semi-liquid in the container contaminates the latter for its purposes of use.

The present invention has for one of its objects to produce a bushing structure in which the connecting means for receiving the bung or closure is operated upon rather than the sheet metal structure in order that a minimum of mechanical operations is necessitated on the comparatively inexpensive material of the sheet metal container wall. Since the connecting means is formed of a comparatively small piece relative to the quantity of material in the sheet metal container, it is possible to form the connecting means of a relatively better grade of material suitable for operating upon at a minimum of expense. The forming operations heretofore necessitated in clamping or holding the connecting means in position in the sheet metal container necessitates for safety a better grade of material than is ordinarily used and a substantial number of defective or so-called "leakers" result in the use of the usual barrel stock.

In order to minimize the operations upon the wall of the sheet metal container and to provide a satisfactory clamping of the connecting means therein, it is contemplated herein to split the flange of the connecting member which extends angularly from a cylindrical collar and to spread the split portions of the flange to receive therebetween the wall of the sheet metal container in clamped engagement. It is possible in the use of such a method of forming a bushing structure to clamp the wall of the container in a fixed relation with the connecting means without actually any forming operations upon material of the container. In some instances of use, however, a single operation may be performed on the wall of the container which, however, does not effect any material strain on that member.

In the use of the present disclosed method, the structure formed thereby provides a means for entirely concealing a gasket member between the clamped portions thereof. Gaskets formed of rubber or composition material may deteriorate readily if acted upon by the contents of the sheet metal container. The gasket, in the present assembly, is not exposed to the contents of the barrel or to the atmosphere and thus retains its original form and does not contaminate the contained material.

One of the objects of this invention is to provide a method for forming a bushing structure of the character indicated above in which the material of the sheet metal container is not subjected to the usual strains accompanying the clamping of a connecting member thereto.

It is also an object of this invention to provide a method of forming a bushing structure for a sheet metal container of the character indicated above which is comparatively inexpensive to use and which will provide an efficient bushing structure.

Other objects and advantages of this invention will hereinafter be more particularly recited and, for a more complete understanding of the characteristic features of this invention, reference may now be had to the following description when taken together with the accompanying drawings, in which Figure 1 is a fragmental plan view in elevation of the beginning of the first step of the method embodying the features of this invention, a bushing ring or connecting means for a bushing structure for a sheet metal container being about to be operated upon by a cutting and spreading member;

Fig. 8 is a central sectional view of the connecting member of Fig. 7, showing the step of being inserted through an opening in the wall of the container;

Fig. 9 is a view similar to Fig. 8 showing the final step with the bushing in a completed state;

Fig. 10 is a top plan view of a connecting means having initially a polygonal periphery;

Fig. 11 is a central sectional view taken on the line 11—11 of Fig. 10, showing the step of inserting the connecting means through an opening in a socket of the wall of the container;

Fig. 12 is a view similar to Fig. 11 showing the step of forming the bent split portion to clamp the connecting means, the bushing structure of Fig. 11 being in a completed state;

Fig. 13 is a central sectional view through a connecting member after the flange extending angularly from the cylindrical collar has been split to receive the wall of the bushing structure;

Fig. 14 is a view similar to Fig. 13, showing the final step, the wall of the receptacle being held in a clamped position and the bushing structure in a completed state;

Fig. 24 is a view similar to Fig. 1 of the beginning of the first step of a method embodying the features of this invention, a modified form of cutting and spreading member being employed to operate directly upon the cylindrical collar of the connecting means;

Fig. 25 is a view similar to Fig. 24, showing the beginning of the second step in the cutting and spreading of the split portion resulting from the step of Fig. 24;

Fig. 26 is a central sectional view of the connecting means in the condition after the completion of the second step of Fig. 25;

Fig. 27 is a view similar to Fig. 26 of the connecting means upon completion of another step in the operation of forming a non-circular edge and after insertion into a hole in the supporting wall of a barrel;

Fig. 29 is a view similar to Fig. 27 after the completion of the final step of the method in forming the bushing structure;

Fig. 30 is a central sectional view through a connecting means after the step of splitting the cylindrical collar thereof, the connecting member being inserted through a hole in the wall of a container;

Fig. 31 is a view similar to Fig. 30, showing a completion of the final step, the wall of the receptacle being held in a clamped position between the split portion of the collar and the flange extending angularly therefrom;

Figures 36, 37:
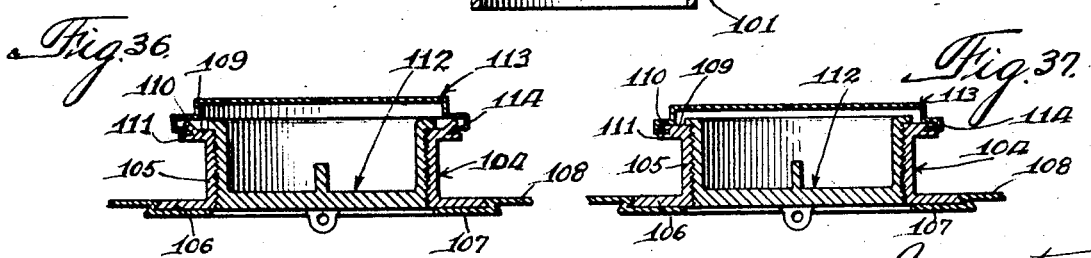

Fig. 36 is a central sectional view of a bushing structure in which the connecting means is clamped in a fixed relation with the sheet metal wall of a container and showing a completion of the initial step in splitting the flange of the connecting means; and Fig. 37 is a view similar to Fig. 36, showing the final step of clamping the sealing cap between the split portions of the flange extending angularly from the connecting means.

Referring now to the drawings, and more particularly to Figs. 1–5, inclusive thereof, the method incorporating the features of this invention consists in the provision of a rotatable support 25 having an extension 26 thereon for receiving the bore of a connecting means or bung ring 27. The connecting means 27 preferably comprises a cylindrical collar 28 having a flange 29 extending angularly therefrom. The flange 29 has a circular peripheral face which is operated upon by a circular cutter 30 to split the flange and to spread the split portions.

In the embodiment shown in the present figures, the cutter 30 has a cutting edge 31 extending radially beyond a flattened face portion 32 thereof, the cutting edge splitting the flange 29 at any desired portion over the peripheral face thereof and the flattened portion 32 of the cutter spreading the split portions to a position at substantially right angles to each other. In the particular method of splitting and spreading herein illustrated, the split portion 29a is not operated upon and the split portion 29b is bent to extend in a plane substantially parallel with the axis of the collar 28 although it may be desirable to bend the split portion 29a and not operate upon the split portion 29b or for both split portions to be operated upon in the splitting and spreading operation.

Figure 1:
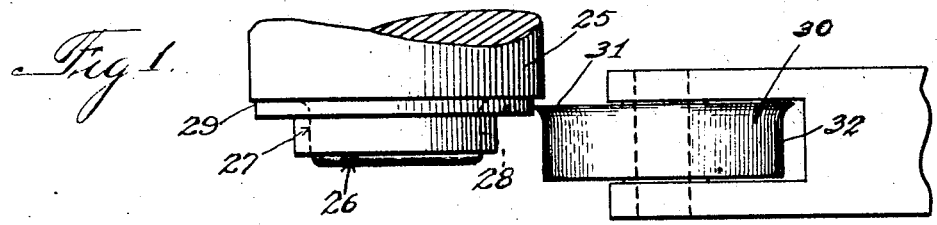
Figure 2:
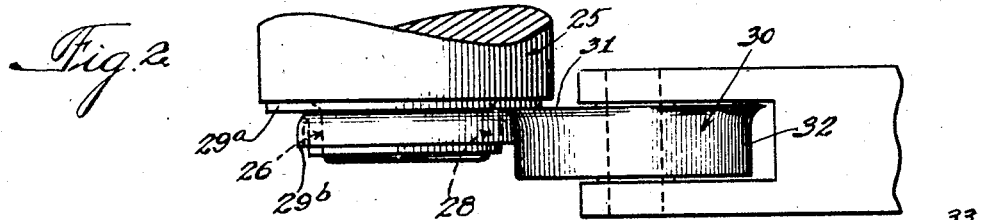
Fig. 2 is a view similar to Fig. 1 showing a completion of the first step in the operation of forming a bushing structure, the flange being shown as split and spread.
Figure 3:
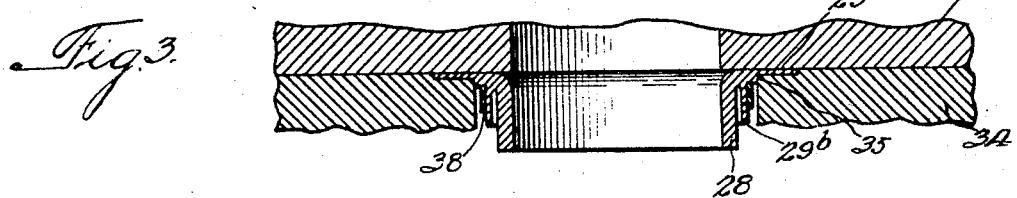
Fig. 3 is a central sectional view of the connecting member of Fig. 2 after it has been operated upon by a punch and die to produce polygonal edges on one of the split portions of the flange of the connecting member.

In the condition of the connecting member shown in Fig. 2, the split portion 29a is next operated upon by a punch and die member 33 and 34, respectively, to compress a portion thereof to provide at the juncture between the flattened portion and that portion not operated upon, a polygonal shoulder 35. The connecting member resulting from the operation described in Fig. 3 is then disposed in position on a container wall 36 for clamping engagement therewith as shown more particularly in Fig. 4.

The container wall 36 is provided with a polygonal aperture of the size and shape of the polygonal shoulder 35 of the split portion 29, the bushing being inserted through the aperture of the wall with the polygonal shoulder 35 engaging the polygonal aperture. The connecting means is thus held against rotation by the engagement of the polygonal edges of the respective shoulder and opening. While a socket 37 is formed in the wall 36 surrounding the opening thereof as shown in full lines in Fig. 4, still it is not necessary nor at times desirable to provide such a socket and the sheet metal wall 37 has been shown in dotted lines in such a condition. The socket 37 is shown as being of annular configuration.

Figure 4:
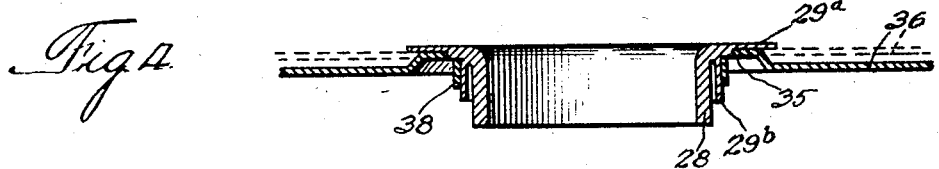
Fig. 4 is a central sectional view of the connecting member of Fig. 3 shown in an inserted position through an aperture in a socket of the sheet metal wall of the container, the latter being shown fragmentarily.
Figure 5:
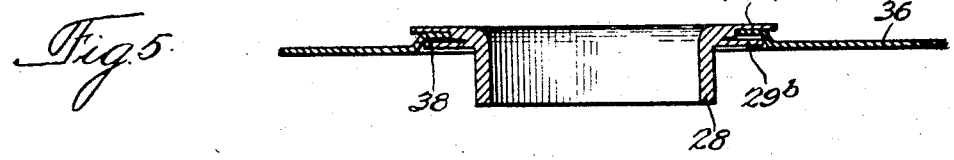
Fig. 5 is a view similar to Fig. 4 showing the completed bushing structure after the split portions have been clamped against opposed sides of the socket in the wall of the container.

A gasket 38 may be disposed in the position shown in Fig. 4 about the bent split portion 29b whereafter the split portion 29b as shown in Fig. 5 is moved into clamping position cooperating with the split portion 29a to hold the connecting member in position against axial displacement and to wholly conceal the gasket 38 and to prevent exposure thereof to the contents of the receptacle. Thus the clamping operation is accomplished in the formation of a split flange which is first spread to receive the wall of the sheet metal container and thereafter moved into clamping position on opposed sides of the wall of the sheet metal container.

The connecting means 27 in these views and in the views to be hereafter described, may be provided with threads in the bore of the cylindrical collar 28 to engage external threads of a bung or other closure or may be provided with any suitable means whereby the closure or bung may be detachably engaged therewith. Such detachable means is not shown since various forms may be employed.

Figure 6:
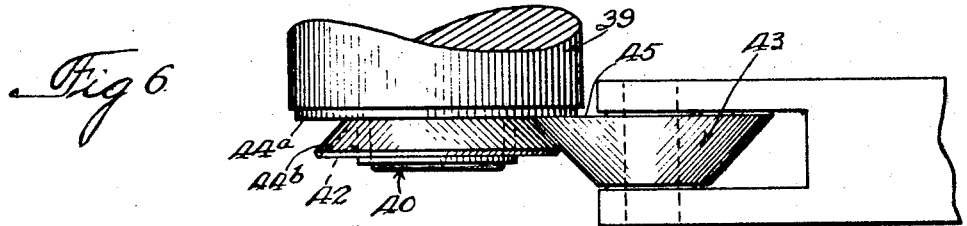
Fig. 6 is a view similar to Fig. 1, showing a modified form of cutting and spreading member at the completion of its initial step in the cutting and spreading of the flange extending from the cylindrical collar of a connecting member.
Figure 7:
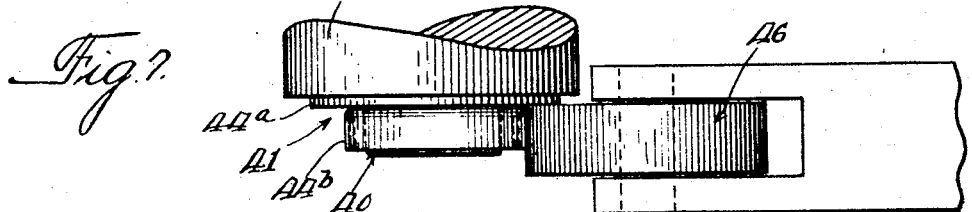
Fig. 7 is a view similar to Fig. 6, showing a completion of the second step in the cutting and spreading of the split portion of Fig. 6.

Referring now more particularly to Figs. 6 and 7 of the drawings, the splitting and deforming operation, previously recited as having been performed in a single operation, is shown as being performed in two operations. The rotatable support 39 is provided with an extension 40 for receiving the bore of a connecting member 41, the connecting member comprising a cylindrical collar 42 having an angularly extending flange. The flange is operated upon by a cutter 43 to provide split portions 44a and 44b, the cutter being frusto-conical shaped and being thus provided with a cutting edge 45 which splits the flange and at the same time spreads one of the split portions to provide a substantial V-shaped groove. A rotary tool 46 having a flat peripheral face is next moved against the bent split portion 44b to move the latter into a plane substantially parallel with the axis of the collar. The resultant connecting member 41 is the same as that shown in Fig. 2, having been operated upon, however, by two separate forming members instead of the single forming member previously described.

Referring now more particularly to Figs. 8 and 9 of the drawings, the connecting member 41 resulting from the operation of Fig. 7 may be disposed in a fixed relation to the sheet metal wall of the container 47 by inserting the cylindrical collar 42 and the bent split portion 44b through an aperture therein. A socket 48 is formed in the sheet metal wall adjacent the aperture therein, the socket being provided with polygonal side walls 49 as shown more particularly in Fig. 9.

The split portion 44b is next moved into the socket 48, a part of the split portion 44b being urged against the face side of the wall of the socket and the marginal portion thereof engageing the polygonal wall 49 of the socket. The bushing structure thus shown is prevented from rotation by reason of the engagement of the part of the split portion 44b with the polygonal wall 49 and the bushing is prevented from axial displacement by reason of the sheet metal wall at the socket thereof being clamped between opposed faces of the split portions 44a and 44b.

Referring now more particularly to Figs. 10, 11 and 12, the connecting member 50 comprises a cylindrical collar 51 having a polygonal flange extending angularly therefrom which has been split in the manner heretofore shown to form portions 52a and 52b, the portion 52b being bent into a plane substantially parallel with the axis of the collar 51. A sealing member 53 is provided with a polygonal recess 54 for receiving the polygonal split portion 52a to prevent relative rotation between the sealing member 53 and the split portion 52a, the sealing member having a plurality of apertures 55 for receiving wires in the usual manner to prevent undetectable access to a plug or other closure means.

An aperture is formed in the wall 56 of a sheet metal container and the material bounding the wall is formed into a socket 57 having polygonal side walls 58. The internal polygonal side walls 58 are of the same size and shape as the polygonal flange extending from the cylindrical collar 51 so that the split portion 52b may be moved into position as shown in Fig. 12 to clamp the split portions against opposed sides thereof. The polygonal split portion 52b engaging the inner polygonal side walls 58 of the socket 57 prevents relative rotation therebetween and the clamping of the split portions against opposed faces of the socket 57 prevents axial displacement of the connecting member from the wall.

Referring now more particularly to Figs. 13 and 14, the connecting member shown in Fig. 13 comprises a cylindrical collar 59 having a flange extending angularly therefrom, the flange being split into portions 60a and 60b. The split portion 60a is bent about a radius and, as shown in Fig. 14, the cylindrical collar 59 is inserted through an aperture in a wall 61 of a sheet metal container, the material bounding the aperture of the wall 61 being formed downwardly and radially outwardly into the radius of the split portion 60a with the latter portion being bent into clamping engagement therewith.

Figure 15:
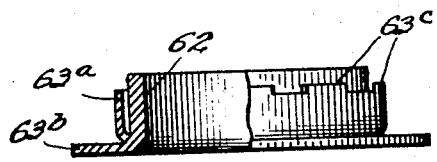
Fig. 15 is a side elevational view partly in section of a modified connecting member after the flange extending angularly from the cylindrical collar has been split and spread.
Figure 16:
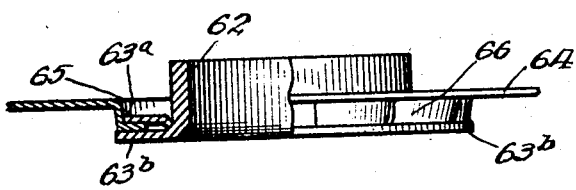
Fig. 16 is a view similar to Fig. 15 of the completed bushing structure, showing the wall of the receptacle in a clamped position.

Referring now more particularly to Figs. 15 and 16, the method therein shown consists in splitting the flange extending angularly from the cylindrical collar 62 into portions 63a and 63b in accordance with the teachings of the preceding figures. The peripheral edge of the split portion 63a is notched or serrated, as at 63c, to form a means for the prevention of rotation between the connecting member and the wall 64 of the sheet metal container. A socket 65 is preferably formed in the wall 64 bounding an aperture therein, the wall 66 of the socket being preferably of circular configuration and of a diameter to receive the split portion 63a across the shortest width thereof.

The extending notches or serrations, when the split portion 63a is moved into clamping position on opposed sides of the socket, force portions of the material of the side wall 66 of the socket radially outwardly to prevent relative rotation between the connecting member and the wall 64. Thus the connecting member is held against axial displacement by reason of having been received between the split portions 63a and 63b in clamped engagement and relative rotation therebetween is prevented by reason of the notches digging into the material of the side wall 66.

Figure 17:
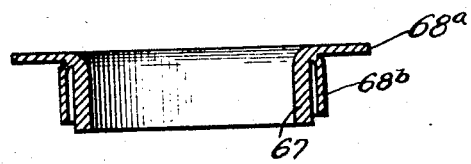
Fig. 17 is a view similar to Fig. 15 of a further modified form of connecting member.
Figure 18:
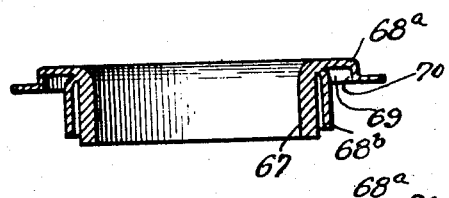
Fig. 18 is a view similar to Fig. 17, showing the step of deforming one of the split portions of the flange.
Figure 19:
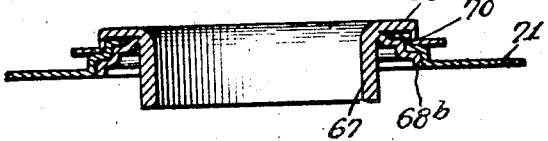
Fig. 19 is a view similar to Fig. 16 of the final step, the connecting means being shown in clamped engagement with the wall of the receptacle.
Figure 20:
Fig. 20 is a view similar to Fig. 17 of another modified form of connecting member construction.

Referring now more particularly to Figs. 17, 18 and 19, the method disclosed therein consists in splitting a flange extending angularly from the cylindrical collar 67 into portions 68a and 68b, the portion 68b being bent into a plane substantially parallel with the axis of the collar in the same manner as described with reference to the preceding modifications. The peripheral edge of the split portion 68a is offset to provide a socket 69 having polygonal internal side walls 70. The cylindrical collar 67 and the bent split portion 68b of the structure thus formed are inserted through an aperture in the wall 71 of a sheet metal container with the split portion 68b being forced in a direction toward the split portion 68a to clamp the material bounding the hole in the wall 71 therebetween.

The connecting member is held against axial displacement from the wall 71 of the sheet metal container by reason of the clamping engagement of the split portions 68a and 68b against opposed sides of the material bounding the aperture. The connecting member is held against relative rotation with the wall 71 by reason of the engagement of that portion of the material bounding the hole in the wall 71 against the polygonal side wall 70 of the recess 69 in which it is clampingly held.

Figure 21:
Fig. 21 is a view similar to Fig. 20, showing a completion of the step of offsetting one of the split portions of the flange.
Figure 22:
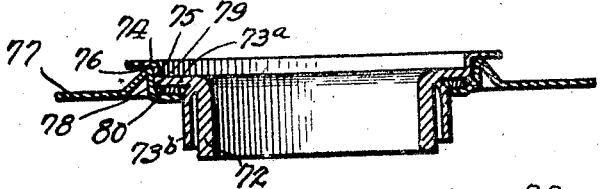
Fig. 22 is a view similar to Fig. 21, showing the step of inserting the connecting member thereof through a hole in the sheet metal container wall.
Figure 23:
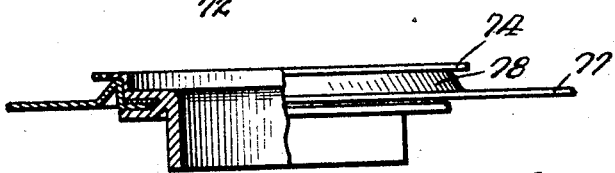
Fig. 23 is a view similar to Fig. 22, showing a completion of the final step in forcing one of the split portions of the connecting member into a clamped position to complete the bushing structure.

Referring now to Figs. 20, 21, 22 and 23, the connecting member is formed by splitting a flange extending from a cylindrical collar 72 into portions 73a and 73b, the portion 73b being bent into a plane substantially parallel with the axis of the collar 72 in the manner disclosed in the previous modifications. The peripheral edge of the split portion 73a is thereafter, as shown in Fig. 21, flattened and offset to provide a raised flange 74 forming a sealing ring and a polygonal recess 75, the offset of the flange 74 providing a peripheral polygonal edge 76 therebelow.

The flange thus disclosed in Fig. 21 is fixed to the wall 77 of a sheet metal container by inserting the cylindrical collar 72 and the split portion 73b through an aperture in the wall 77, a bead 78 being formed in the wall 77 of the sheet metal receptacle in a spaced relation from the hole thereof, the internal wall 79 of the bead 78 being of polygonal configuration to conform to the polygonal periphery 76 of the split portion 73a. The split portion 73b is thereafter moved into clamping engagement with the wall 77, the material between the bead 78 and the hole lying between opposed faces of the split portions 73a and 73b as shown more particularly in Fig. 23.

Instead of operating upon a flange extending angularly from the cylindrical collar to split the flange for purposes of clamping the wall of a sheet metal container therebetween, it may be desirable, and in some instances preferable, to split the cylindrical collar at either or both ends thereof to form the angularly extending clamping portions. Referring now more particularly to Fig. 24 of the drawings, a rotatable support 81 is provided with a reduced extension 82 fixedly secured thereto upon which may be mounted a cylindrical collar 83.

A parting tool 84 is adjustably mounted in carrier 85 secured to a movable arm 86, the arm 86 having movement in the axial direction of the rotatable support and extension 81 and 82 respectively. The parting tool has a pointed cutting portion extending from an angular face 87 thereof. The cutting edge splits the collar, and the angularly extending face 87 spreads the split portion outwardly to form a V groove.

Referring now more particularly to Fig. 25, the split portion 88 is operated upon by the flat face of a disc 89 to move the split portion 88 at a desired angle with respect to the axis of the bore. In the drawings, the disc 89 has a flat face in order to move the split portion 88 at substantially right angles to the axis of the bore of the connecting means although the face of the disc 89 may be of any desired angularity so that a movement thereof in the direction of the axis of the bore may move the split portion to a position at any desired angle with respect to the axis of the bore. The connecting means 83 may next be operated upon by the parting tool 84 to split a second portion 90 in order to form two complementary split portions 88 and 90 for clamping the wall 91 of a sheet metal container therebetween.

After the split portion 90 has been moved to the dotted line position shown in Fig. 26, it may then be necessary to move it back to its full line position in the same figure in order to permit of its insertion through the wall of a sheet metal container depending upon the size of the hole and the angle at which the split portion 90 extends after completion of the splitting and spreading operation.

Figure 28:
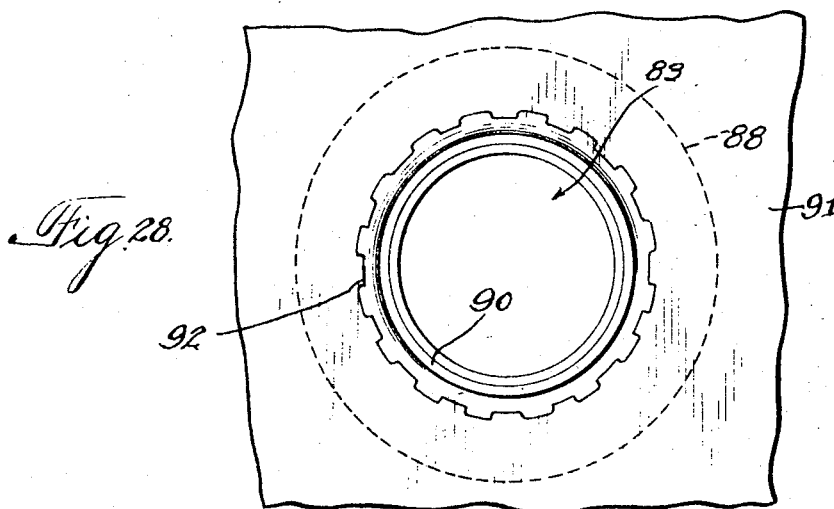
Fig. 28 is an underneath elevational view of Fig. 27.

In the form shown in Fig. 27, the connecting member of Fig. 26 has been operated upon by a punch and die member to compress the marginal edge of the split portion 88 and to form a scalloped shoulder 92 at the juncture of the compressed portion with the enlarged portion as shown more particularly in Fig. 28. The compressed portion of the split portion 88 forms a recess to receive the material of the wall 91 surrounding the aperture thereof, the aperture being of the same scalloped configuration as that of the shoulder 92. While a socket 93 has been formed about the scalloped peripheral opening in the wall 91 this is, of course, not necessary nor in some instances may it be desirable.

After the completion of the step of inserting the collar into position extending in part through the hole in the wall 91 of the sheet metal container with the material of the wall bounding the hole thereof seating in the recess with the scalloped peripheries of the hole and shoulder in engagement, the split portion 90 is moved into position against the underneath side of the material of the wall 91 bounding the opening to hold the connecting means against displacement from the wall. The scalloped peripheral engagement of the shoulder of the split portion 88 with the hole in the wall 91 prevents relative rotation between the connecting member and the wall.

It may also be desirable in a connecting member having a flange extending angularly therefrom to employ the flange in cooperation with a split portion of the cylindrical collar to clampingly hold the wall of a sheet metal container therebetween. Referring now more particularly to Figs. 30 and 31, the cylindrical collar 94 has a flange 95 extending angularly therefrom, the flange having a non-circular or polygonal periphery. One end of the cylindrical collar opposite to that end having the flange 95 extending therefrom is split and spread in the manner shown in Fig. 24 to form a portion 96. The split portion 96 is moved back to its original position in order that the collar may be passed through an aperture in a polygonal socket 97 formed in the wall 98 of a sheet metal container.

Fig. 30 shows the position of the connecting member after the cylindrical collar thereof has been extended through the hole in the socket 97 with the polygonal flange engaging the polygonal socket so as to prevent relative rotation between the connecting member and the wall of the container. In order to prevent axial displacement of the connecting member from the wall of the container, the split portion 96 is moved against the outside wall of the socket 97 in order to form a clamping engagement between the split portion 96 and its cooperating flange member 95.

Referring now more particularly to Figs. 32-35, inclusive, a connecting member formed of a cylindrical collar 99 is shown as being split on both ends to form portions 100 and 101. These ends may be split in the manner shown in Figs. 24 and 25 so that the split portions extend at substantially right angles to the axis of the collar. After the completion of the splitting and spreading operation one of the split portions, and as shown more particularly in Fig. 33 the split portion 101, is trimmed to provide a polygonal periphery as shown more particularly in Fig. 34 with the other split portion, in this case the split portion 100, being provided with spaced apertures for receiving a sealing wire.

Figure 32:
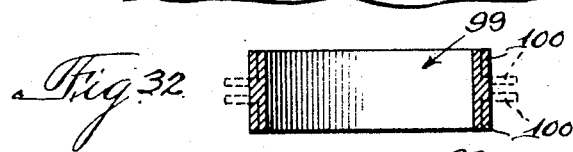
Fig. 32 is a central sectional view through a cylindrical collar showing a completion of the step of splitting the opposite ends of the collar, the split ends being shown in a spread condition in dotted lines.
Figure 33:
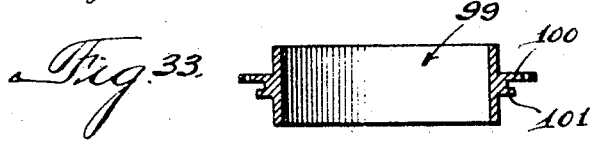
Fig. 33 is a view similar to Fig. 32 showing a completion of the step of spreading the split portions, one of the split portions having its peripheral edge cut to form a non-circular or polygonal periphery.
Figure 34:
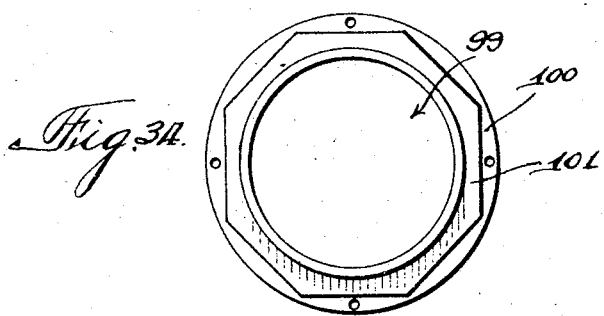
Fig. 34 is an underneath elevational view of Fig. 33.
Figure 35:
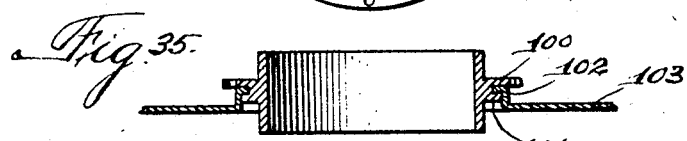
Fig. 35 is a view similar to Fig. 33, showing a completion of the final step, the wall of the receptacle being held in a clamped position between the split and deformed portions of the cylindrical collar.

In assembling the connecting member thus formed by the operations described in Figs. 32 and 33, one of the split portions may be bent back to its original position in order that the bushing may be inserted through an aperture of a polygonal socket 102 formed in the wall 103 of a sheet metal container. After the connecting member is disposed in the hole of the socket, the split portion which is bent back to its original position, is returned to clamping engagement on one side of the wall of the socket as is shown in Fig. 35, the polygonal periphery of the split portion 101 engaging the polygonal side walls of the socket 102 to prevent relative rotation therebetween and the clamping engagement of the cooperating split portions 100 and 101 holding the connecting member against displacement therefrom.

The method of forming a bushing structure may also be extended to include the clamping of a sealing cap to the connecting means for preventing undetectable access to the contents of the sheet metal container.

Referring now more particularly to Figs. 36 and 37 of the drawings, a connecting means 104 comprising a cylindrical collar 105 is provided with a radially extending flange 106 for engagement with a socket 107 of a wall 108 of a sheet metal container. The flange 106 is retained against displacement from the socket 107 by means of the edges being tapered for engagement with correspondingly tapered side walls of the socket. This is a usual form of clamping engagement between a connecting means and a wall of a container although the connecting means may be welded or otherwise clamped in any suitable manner.

The other end of the cylindrical ring 105 is provided with an angularly extending flange 109, the flange being split into portions 110 and 111 and the split portions being spread to form an angular groove.

The cylindrical collar portion 105 of the connecting means is internally threaded to receive a plug or closure 112 for sealing the contents of the receptacle. In order to prevent undetectable access to the closure or plug 112 a sealing cap 113 is provided, the sealing cap being preferably of stepped cross section and having a channel-shaped peripheral groove 114. The sealing cap is disposed in position as shown in Fig. 36 with the internal channel thereof in registration with the split portion 110 after the bung is inserted into the connecting means. In order to clamp the sealing member 113 in position, the split portion 110 is moved downwardly in a direction toward the split portion 111 to clamp the radially inwardly extending lip of the channel therebetween as shown more particularly in Fig. 37.

While several embodiments of this invention are herein shown and described, it is to be understood that various modifications thereof may be apparent to those skilled in the art without departing from the spirit and scope of this invention and, therefore, the same is only to be limited by the scope of the prior art and the appended claims.

I claim:

1. The method of forming a bushing structure for a sheet metal container which consists in splitting a flange extending angularly from a cylindrical collar, in spreading the split portions of the flange to receive therebetween a wall of the sheet metal container, in forming polygonal edges on one of said split portions to engage corresponding polygonal edges of said wall, and in clamping the split portions against opposed sides of said wall.

2. The method of forming a bushing structure for a sheet metal container which consists in splitting a polygonal flange extending angularly from a cylindrical collar, in spreading the split portions of the flange to receive therebetween polygonal edges of a sealing ring and a wall of the sheet metal container, and in clamping the split portions against opposed sides of said wall with the polygonal edges of the split portions engaging the polygonal edges of the sealing ring and the wall.

3. The method of forming a bushing structure for a sheet metal container which consists in splitting a flange extending angularly from a cylindrical collar, in notching the peripheral edge of one of the split portions, in spreading the split portions of the flange to receive therebetween an offset portion of a wall of the sheet metal container, and in clamping the split portions against opposed sides of the offset of said wall with the notches forming seats in the shoulder of the offset portion.

4. The method of forming a bushing structure for a sheet metal container which consists in splitting a flange extending angularly from a cylindrical collar, in spreading the split portions of the flange to receive therebetween a wall of the sheet metal container, in offsetting a marginal portion of one of the split portions to form an internal polygonal recess, and in clamping the split portions against opposed sides of said wall to force the engaged material thereof into said polygonal recess.

5. The method of forming a bushing structure for a sheet metal container which consists in splitting a flange extending angularly from a cylindrical collar, in spreading the split portions of the flange to receive therebetween a wall of the sheet metal container, in reducing a marginal portion of one of said split portions, in offsetting the reduced marginal portion to provide polygonal edges at the juncture of the offset portion and the main body portion, and in clamping the split portions against opposed sides of said wall.

6. The method of forming a bushing structure for a sheet metal container which consists in splitting a flange extending angularly from a cylindrical collar, in spreading the split portions of the flange to receive therebetween a wall of the sheet metal container, having a polygonal offset portion, and in clamping the split portions against opposed sides of said wall and against the polygonal offset portion.

7. The method of forming a bushing structure for a sheet metal container which consists in splitting a flange extending angularly from a cylindrical collar, in spreading the split portions of the flange to receive therebetween a wall of the sheet metal container, in offsetting and perforating one of said split portions to form a sealing ring, and in clamping the split portions against opposed sides of said wall.

8. The method of forming a bushing structure for a sheet metal container which consists in splitting a flange extending angularly from a cylindrical collar, in bending one of the split portions into a plane substantially parallel with the axis of said collar, in reducing the thickness of a marginal portion of the other of the split portions to form polygonal edges at the juncture of the reduced and enlarged portions thereof, in inserting the collar and bent split portion through a polygonal aperture in a wall of the sheet metal container to a position such that the other split portion rests on one side of the wall and the polygonal edges engage the polygonal aperture, and in clamping the bent split portion against the other side of the wall.

9. The method of forming a bushing structure for a sheet metal container which consists in splitting a polygonal flange extending angularly from a cylindrical collar, in bending one of the split portions into a plane substantially parallel with the axis of said collar, in inserting the collar and bent split portion through an aperture in polygonal sockets formed in a sealing ring and in a wall of the sheet metal container to a position such that the other split portion seats in the polygonal socket of the sealing ring, and in forcing the bent split portion to seat in the polygonal socket of the wall.

10. The method of forming a bushing structure for a sheet metal container which consists in splitting a flange extending angularly from a cylindrical collar, in bending one of the split portions into a plane substantially parallel with the axis of said collar, in notching the bent split portion along the peripheral edge thereof, in inserting the collar and bent split portion through an aperture in a polygonal socket of a wall of the sheet metal container to a position such that the other split portion rests on one side of the socket, and in forcing the bent split portion to a position within the socket with the notches forming seats in the wall of the socket.

11. The method of forming a bushing structure for a sheet metal container which consists in splitting a flange extending angularly from a cylindrical collar, in bending one of the split portions into a plane substantially parallel with the axis of said collar, in offsetting a marginal portion of the other of said split portions to form an internal polygonal recess, in inserting the collar and bent split portion through an aperture in a wall of the sheet metal container, and in forcing the bent split portion against the wall to force the engaged portion into the internal polygonal recess of the other of said split portions.

12. The method of forming a bushing structure for a sheet metal container which consists in splitting a flange extending angularly from a cylindrical collar, in bending one of the split portions into a plane substantially parallel with the axis of said collar, in reducing a marginal portion of one of said split portions, in offsetting the reduced marginal portion to produce polygonal edges at the juncture of the offset portion and the main body portion, in inserting the collar and bent split portion through an aperture in a wall of the sheet metal container to a position such that the main body portion of the other split portion rests on one side of the wall with the polygonal edges thereof seating against a polygonal bead formed in said wall, and in clamping the bent split portion against the other side of the wall.

13. The method of forming a bushing structure for a sheet metal container which consists in splitting a flange extending angularly from a cylindrical collar, in bending one of the split portions into a plane substantially parallel with the axis of said collar, in providing the bent split portion with a polygonal periphery, in inserting the collar and bent split portion through an aperture in a polygonal socket of a wall of the sheet metal container, and in forcing the bent split portion to seat in said socket with the polygonal periphery thereof engaging the polygonal walls of said socket.

14. The method of forming a bushing structure for a sheet metal container which consists in splitting a flange extending angularly from a cylindrical collar, in bending one of the split portions into a plane substantially parallel with the axis of said collar, in inserting the collar and bent split portion through an aperture in a polygonal socket of a wall of the sheet metal container to a position such that the other split portion rests on one side of the socket, and in clamping the bent split portion within the other side of the socket and against the polygonal walls thereof.

15. The method of forming a bushing structure for a sheet metal container which consists in splitting a flange extending angularly from a cylindrical collar, in bending one of the split portions into a plane substantially parallel with the axis of said collar, in offsetting and perforating a marginal portion of the other split portion to form a sealing ring, in inserting the collar and bent split portion through an aperture in a wall of the sheet metal container to a position such that the other split portion rests on one side of the wall, and in clamping the bent split portion against the other side of the wall.

MORRIS SCHWARTZ.